United States Patent
Wang et al.

(10) Patent No.: US 10,705,640 B2
(45) Date of Patent: Jul. 7, 2020

(54) TOUCH PANEL AND METHOD FOR FABRICATING THE SAME, TOUCH DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Jing Wang, Beijing (CN); Lei Zhang, Beijing (CN); Zouming Xu, Beijing (CN); Qitao Zheng, Beijing (CN); Xiaodong Xie, Beijing (CN); Guiyu Zhang, Beijing (CN); Dong Li, Beijing (CN); Tsungchieh Kuo, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 16/305,980

(22) PCT Filed: May 24, 2018

(86) PCT No.: PCT/CN2018/088136
§ 371 (c)(1),
(2) Date: Nov. 30, 2018

(87) PCT Pub. No.: WO2019/037494
PCT Pub. Date: Feb. 28, 2019

(65) Prior Publication Data
US 2019/0163306 A1 May 30, 2019

(51) Int. Cl.
*G06F 1/16* (2006.01)
*G06F 3/041* (2006.01)
*G06F 3/044* (2006.01)

(52) U.S. Cl.
CPC .......... *G06F 3/0412* (2013.01); *G06F 1/1643* (2013.01); *G06F 3/044* (2013.01);
(Continued)

(58) Field of Classification Search
None
See application file for complete search history.

(56) References Cited

U.S. PATENT DOCUMENTS

2009/0315854 A1* 12/2009 Matsuo ................. G06F 3/044 345/174
2011/0090154 A1* 4/2011 Kuo ..................... G06F 3/044 345/173

(Continued)

FOREIGN PATENT DOCUMENTS

| CN | 106354299 A | 1/2017 |
| CN | 206058170 U | 3/2017 |
| CN | 106919278 A | 7/2017 |

OTHER PUBLICATIONS

Search Report and Written Opinion for International Patent Application No. PCT/CN2018/088136 dated Aug. 31, 2018.
First Office Action for Indian Application No. 201847046340 dated Apr. 20, 2020.

*Primary Examiner* — Kent W Chang
*Assistant Examiner* — Benjamin Morales
(74) *Attorney, Agent, or Firm* — Calfee, Halter & Griswold LLP (57) ABSTRACT

A touch panel, a touch display device, and a method for fabricating the touch panel are disclosed. The touch panel comprises: a substrate; a plurality of touch sensing units arranged in an array on the substrate, each of the touch
(Continued)

sensing units including a first touch sub-electrode arranged in a first direction, two second touch sub-electrodes arranged on both sides of the first touch sub-electrode and arranged in a second direction, and an electrode slit disposed between each of the second touch sub-electrodes and the first touch sub-electrode; wherein the two second touch sub-electrodes in each of the touch sensing units are electrically connected via at least two first bridges.

18 Claims, 6 Drawing Sheets

(52) U.S. Cl.
CPC .......... *G06F 3/0443* (2019.05); *G06F 3/0446* (2019.05); *G06F 3/0448* (2019.05); *G06F 2203/04103* (2013.01); *G06F 2203/04111* (2013.01)

(56) References Cited

U.S. PATENT DOCUMENTS

| | | | |
|---|---|---|---|
| 2011/0141038 A1* | 6/2011 | Kuo ...................... | G06F 3/0412 345/173 |
| 2012/0298428 A1* | 11/2012 | Lai .......................... | G06F 3/044 178/18.06 |
| 2012/0325639 A1* | 12/2012 | Scuderi ................... | G06F 3/044 200/600 |
| 2015/0077383 A1* | 3/2015 | Kang ...................... | G06F 3/044 345/174 |
| 2016/0202831 A1* | 7/2016 | Kim ........................ | G06F 3/044 345/173 |
| 2016/0209952 A1* | 7/2016 | Lin .......................... | G06F 3/044 |
| 2017/0249039 A1* | 8/2017 | Kim ........................ | G06F 3/0416 |
| 2017/0262108 A1* | 9/2017 | Lin ................... | G02F 1/133528 |
| 2018/0039358 A1 | 2/2018 | Xie et al. | |
| 2018/0039360 A1* | 2/2018 | Akimoto .............. | C07K 16/303 |
| 2018/0052553 A1 | 2/2018 | Wang et al. | |
| 2019/0051708 A1* | 2/2019 | Jeong .................... | G06F 3/0416 |

* cited by examiner

TOUCH PANEL AND METHOD FOR FABRICATING THE SAME, TOUCH DISPLAY DEVICE

RELATED APPLICATION

The present application is the U.S. national phase entry of PCT/CN2018/088136, with an international filing date of May 24, 2018, which claims the priority of the Chinese Patent Application No. 201710719365.3 filed on Aug. 21, 2017, the entire disclosure of which is incorporated herein by reference.

FIELD

The present disclosure relates to the field of display technologies, and in particular, to a touch panel, a touch display device, and a method for fabricating the touch panel.

BACKGROUND

In recent years, the market for small and medium sized displays has undergone tremendous changes, the shipment of active matrix organic light-emitting diode (AMOLED) panels has rapidly increased, and the development momentum is rapid. Flexible display technology provides fabricators with more innovation space. In order to be widely used in high-end mobile phones and a new generation of wearable display systems, it is necessary to mount touch sensors on a flexible display product. Current mainstream touch sensor fabricating processes include GFF (Glass+Film+Film), GF (Glass+Film) and other types of bridges. In the design process of touch sensor patterns such as GF bridges, the adoption of metal bridges or Indium Tin Oxide (ITO) bridges is highly controversial. Although the metal bridge has good ductility, the effect of the anti-ghosting is poor. Adopting ITO bridge could achieve good anti-ghosting effect, but cracking as the resulting of bending tends to occur.

SUMMARY

According to an exemplary embodiment, an exemplary embodiment provides a touch panel comprising: a substrate; a plurality of touch sensing units arranged in an array on the substrate, each of the plurality of touch sensing units including a first touch sub-electrode arranged in a first direction, two second touch sub-electrodes arranged on both sides of the first touch sub-electrode and arranged in a second direction, and an electrode slit disposed between each of the second touch sub-electrodes and the first touch sub-electrode; wherein the two second touch sub-electrodes in each of the plurality of touch sensing units are electrically connected via at least two first bridges. In some exemplary embodiments, the electrode slit has a jagged shape. In some exemplary embodiments, a first slit and at least two second bridges are disposed between two touch sensing units adjacent in the first direction, the at least two second bridges span the first slit and electrically connect two first touch sub-electrodes of the two touch sensing units.

In some exemplary embodiments, a first slit and at least two second bridges are disposed between two touch sensing units adjacent in the first direction. Thereby, the anti-ghosting effect of the touch panel is further improved. Further, the bending resistance of the touch panel along the second direction is enhanced.

In some exemplary embodiments, a second slit and at least two third bridges are disposed between two touch sensing units adjacent in the second direction, and the at least two third bridges span the second slit and electrically connect two second touch sub-electrodes which are directly adjacent in the two touch sensing units.

In some exemplary embodiments, a second slit and at least two third bridges are disposed between two touch sensing units adjacent in the second direction. Thereby, the anti-ghosting effect of the touch panel is further improved. Further, the bending resistance of the touch panel in the first direction is enhanced.

In some exemplary embodiments, at least one of a length direction of the second bridge and a length direction of the third bridge is inclined to the first direction.

Using the second bridge and/or the third bridge inclined to the first direction (or the second direction) may further enhance the anti-ghosting effect without affecting the conductivity between adjacent touch sensing units.

In some exemplary embodiments, the first slit and the second slit both have a jagged shape.

In some exemplary embodiments, each of the plurality of touch sensing units further includes a floating electrode, the floating electrode located between a first touch sub-electrode and a second touch sub-electrode which are adjacent to each other, and insulated from the first touch sub-electrode and the second touch sub-electrode; wherein the first touch sub-electrode, the second touch sub-electrode and the floating electrode are disposed in a same layer.

In some exemplary embodiments, configuring the floating electrode such that it is insulated from the first touch sub-electrode and the second touch sub-electrode may shield electrical signal interference, thereby improving the touch sensitivity of the touch panel. In addition, the floating electrode may be used to control the initial capacitance and the capacitance increment of the touch sensing unit, thereby adjusting the electrical parameters of the touch sensing unit. In some exemplary embodiments, the first touch sub-electrode, the second touch sub-electrode, and the floating electrode in the touch panel may be fabricated using a single mask process, thereby simplifying the fabrication process steps and reducing the overall thickness of the touch panel. In some exemplary embodiments, the floating electrode has a jagged edge. Using a floating electrode with a jagged edge further improves the anti-ghosting effect.

In some exemplary embodiments, materials of the first touch sub-electrode, the second touch sub-electrode, the floating electrode, and the first bridge are all transparent conductive materials. Those skilled in the art will appreciate that the second bridge and the third bridge may also be fabricated using a same transparent conductive material.

In some exemplary embodiments, the first touch sub-electrode, the second touch sub-electrode, the floating electrode, the first bridge, the second bridge, and the third bridge are fabricated by using transparent conductive materials, which may further eliminate reflection of ambient light by the touch sensing unit, thereby enhancing the anti-ghosting effect. Moreover, since the touch panel provided by the exemplary embodiment of the present disclosure has the above structural features, the undesirable characteristic of the transparent conductive material being easy to crack when bent is advantageously eliminated.

In some exemplary embodiments, the transparent conductive materials are indium tin oxide or indium zinc oxide.

In some exemplary embodiments, a process such as magnetron sputtering, chemical vapor deposition, or sol-gel may be used to form an indium tin oxide or indium zinc oxide film layer, and the first touch sub-electrode, the second touch sub-electrode, the floating electrode, the first bridge, the second bridge, and the third bridge are fabricated using a mask process.

According to another aspect of the disclosure, an exemplary embodiment of the present disclosure also provides a touch display device. The touch display device includes the touch panel described in the above exemplary embodiments.

According to another aspect of the disclosure, an exemplary embodiment of the present disclosure also provides a method for fabricating a touch panel. The method comprises: providing a substrate; arranging a plurality of touch sensing units in an array on the substrate, each of the plurality of touch sensing units including a first touch sub-electrode arranged in a first direction, and two second touch sub-electrodes arranged on both sides of the first touch sub-electrode and arranged in a second direction; disposing an electrode slit between each of the two second touch sub-electrodes and the first touch sub-electrode; and disposing at least two first bridges, each of the at least two first bridges electrically connecting the two second touch sub-electrodes in each of the plurality of touch sensing units.

Optionally, the exemplary method further comprises: between two touch sensing units adjacent in the first direction, disposing a first slit and at least two second bridges, wherein the at least two second bridges span the first slit and electrically connect two first touch sub-electrodes of the two touch sensing units.

Optionally, the exemplary method further comprises: disposing a second slit and at least two third bridges between two touch sensing units adjacent in the second direction, wherein the at least two third bridges span the second slit and electrically connect two second touch sub-electrodes which are directly adjacent in the two touch sensing units.

Optionally, the exemplary method further comprises: disposing a floating electrode in each of the plurality of touch sensing units, the floating electrode located between a first touch sub-electrode and a second touch sub-electrode which are adjacent to each other, and insulated from the first touch sub-electrode and the second touch sub-electrode; wherein the first touch sub-electrode, the second touch sub-electrode and the floating electrode are disposed in a same layer.

In some exemplary embodiments, the floating electrode has a jagged edge. In some exemplary embodiments, the first touch sub-electrode, the second touch sub-electrode, and the floating electrode in the touch panel are fabricated using a single mask process.

In some exemplary embodiments, the step of arranging a plurality of touch sensing units on the substrate comprises: forming a pattern of the first touch sub-electrode and the second touch sub-electrodes on the substrate by a photolithography process; the step of disposing at least two first bridges comprises: forming a first photoresist layer covering the pattern of the first touch sub-electrode and the second touch sub-electrode, forming a via in the first photoresist layer at a position corresponding to a bridge point of the first bridge, and filling the via with a conductive material and forming the first bridge.

In some exemplary embodiments, before the step of disposing the at least two first bridges, the method further comprises: forming a metal trace pattern around the pattern of the first touch sub-electrode and the second touch sub-electrode.

DETAILED DESCRIPTION

Technical solutions of exemplary embodiments of the present disclosure are clearly and completely described in the following with reference to the accompanying drawings in the exemplary embodiments of the present disclosure. It is obvious that the described exemplary embodiments are only a part of the embodiments of the present disclosure, and not all of the embodiments. All other embodiments obtained by a person of ordinary skill in the art based on the exemplary embodiments of the present disclosure without making any creative effort all fall within the scope of this patent protection.

The inventors realized that when designing a touch sensor pattern, it is necessary to take into account both the anti-ghosting effect and the bending resistance of the bridge at the same time. A metal bridge has good ductility, but the anti-ghosting effect is poor. A bridge such as an ITO material has a good anti-ghosting effect, but it is easy to crack when bent. Therefore, it is desirable to provide a touch sensor design that combines both anti-ghosting and bending resistance.

In view of this, exemplary embodiments of the present disclosure provide a touch panel, a touch display device, and a method for fabricating the touch panel, which improve the anti-ghosting effect of the touch panel and increase the ability to release stress.

Figure 1:
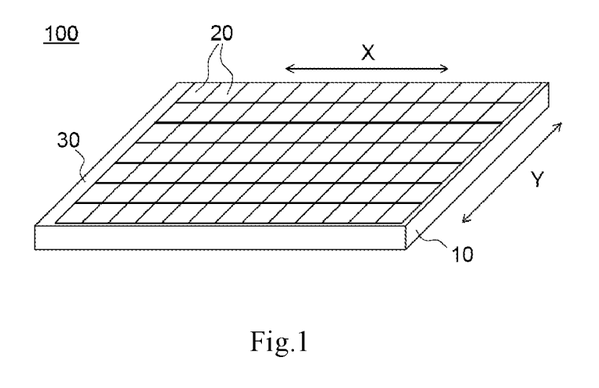
FIG. 1 is a schematic structural diagram of a touch panel according to an exemplary embodiment of the present disclosure.
Figure 2:
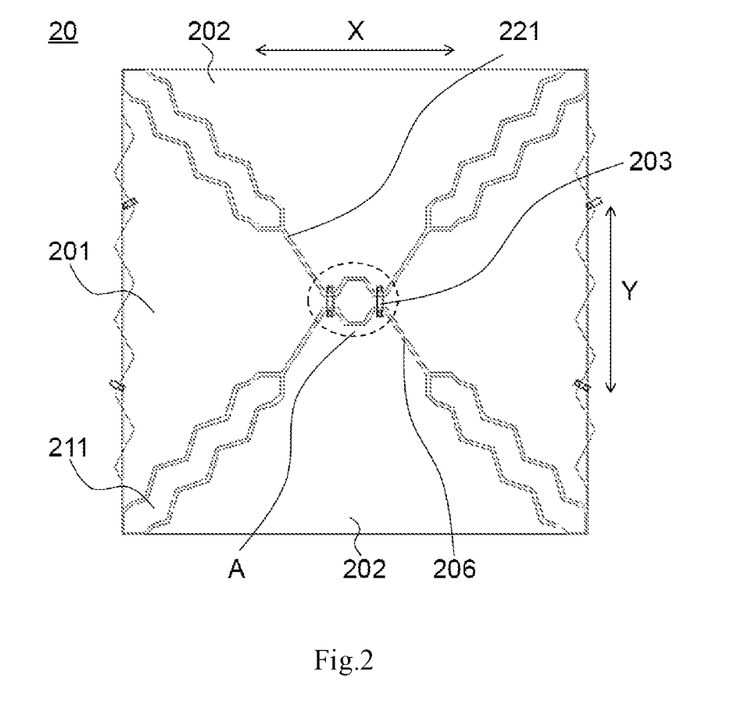
FIG. 2 is a schematic structural diagram of a touch sensing unit of the touch panel shown in FIG. 1.
Figure 3:
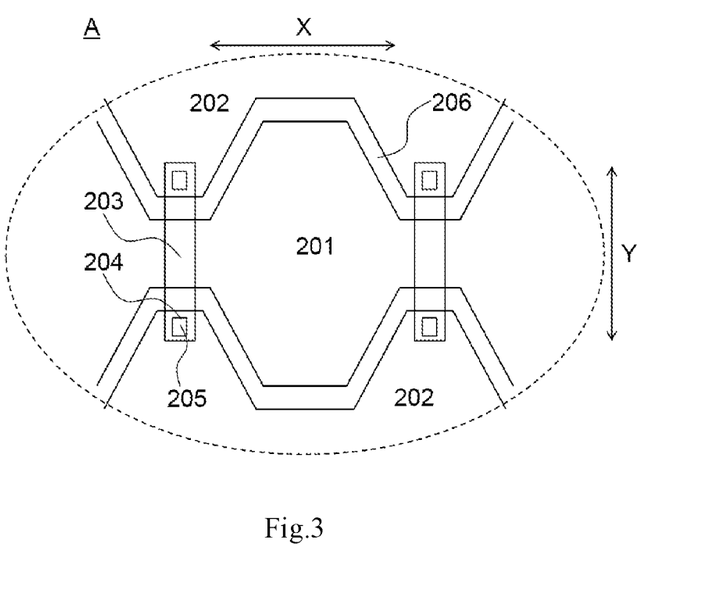
FIG. 3 is a partial view of the touch sensing unit shown in FIG. 2.

According to an aspect of the disclosure, an exemplary embodiment of the present disclosure provides a touch panel. FIG. 1 is a schematic structural diagram of a touch panel according to an exemplary embodiment of the present disclosure. FIG. 2 is a schematic structural diagram of a touch sensing unit of the touch panel shown in FIG. 1. FIG. 3 is a partial view of a region A in the touch sensing unit shown in FIG. 2. As shown in FIG. 1 to FIG. 3, the touch panel 100 includes a substrate 10 and a plurality of touch sensing units 20 arranged in an array on the substrate 10. Each of the touch sensing units 20 includes a first touch sub-electrode 201 arranged in a first direction X, two second touch sub-electrodes 202 arranged on both sides of the first touch sub-electrode 201 in a second direction Y, and an electrode slit 221 disposed between each of the second touch sub-electrodes 202 and the first touch sub-electrode 201; wherein two second touch sub-electrodes 202 in each of the touch sensing units 20 are electrically connected via at least two first bridges 203.

A via plug 205 is provided in a via 204 at a position where each of the bridges 203 contacts the second touch sub-electrodes 202 as shown in FIG. 3. A person skilled in the art may understand that a jagged electrode slit may be disposed between the first touch sub-electrode 201 and the second touch sub-electrodes 202 in each touch sensing unit 20 (as indicated by 206 in FIG. 3).

In an exemplary embodiment of the present disclosure, the two second touch sub-electrodes 202 in each of the touch sensing units 20 are electrically connected by at least two bridges 203. As shown in FIG. 3, a via plug 205 is provided in the via 204 at a position where each of the bridge 203 contacts the second touch sub-electrodes 202. With the above arrangement, there may be a greater spacing between adjacent bridges. Compared with the denser bridge arrangement in the related art, the bridge structure in the touch sensing unit 20 will be less obvious, and the anti-ghosting effect of the touch panel 100 is improved. Conductive oxide materials such as ITO have poor ductility, and are prone to crack when there is stress inside, which affects product function. By connecting a plurality of electrodes made of ITO material by way of a bridge 203, stress may be released at the connection region, and the internal stress may be removed. Therefore, the use of at least two bridges 203 increases the ability of the touch sensing unit 20 to release stress. When the touch panel 100 provided in the embodiment of the present disclosure is bent in any direction, at least two bridges 203 in each touch sensing unit 20 may effectively release stress, and disconnection between the two second touch sub-electrodes 202 are avoided, thus increasing the reliability of the bendable touch panel. In addition, with the above arrangement, various sizes of touch sensing units may be fabricated to support touch chips having various channel numbers and touch schemes.

As shown in FIG. 1, in the touch panel 100 provided by the exemplary embodiment of the present disclosure, a trace area 30 may also be arranged around the plurality of touch sensing units 20 arranged in an array. A metal trace pattern may be arranged inside the trace area 30 for connecting the plurality of touch sensing units 20 to an external circuit.

Figure 4:
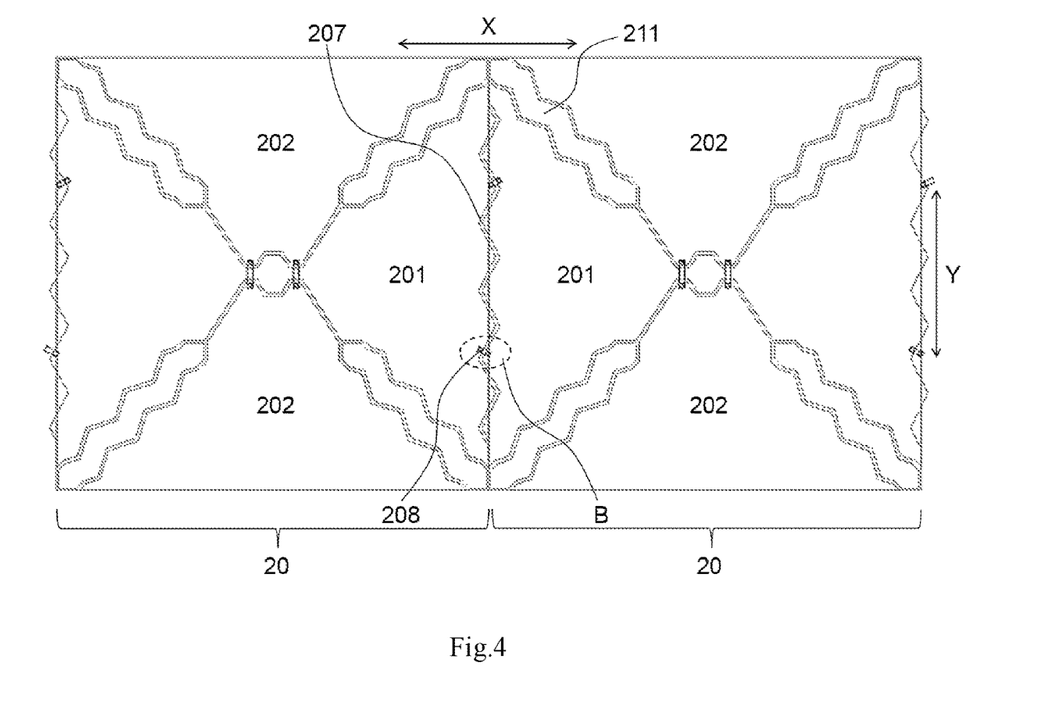
FIG. 4 is a schematic structural diagram of two adjacent touch sensing units according to an exemplary embodiment of the present disclosure.
Figure 5:
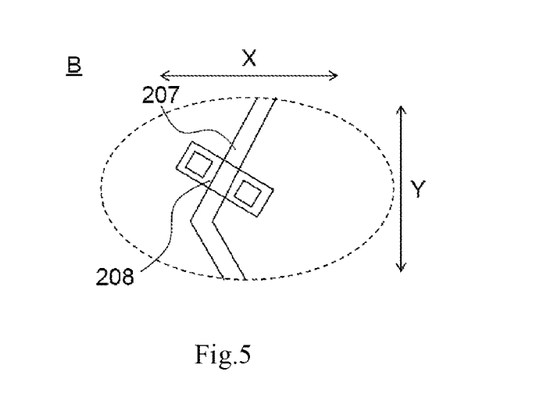
FIG. 5 is a partial view of the adjacent two touch sensing units shown in FIG. 4.

FIG. 4 is a schematic structural diagram of two adjacent touch sensing units according to an exemplary embodiment of the present disclosure. FIG. 5 is a partial view of a region B in the touch sensing unit shown in FIG. 4. In some exemplary embodiments, as shown in FIG. 4 and FIG. 5, a first slit 207 and at least two second bridges 208 are disposed between two touch sensing units 20 adjacent in the first direction X. The at least two second bridges 208 span the first slit 207 and electrically connect two first touch sub-electrodes 201 of the two touch sensing units 20.

In some exemplary embodiments, the electrode slit 221 has a jagged shape. Due to the reflection of light, an edge of the electrode slit 221 (i.e., an edge of the first touch sub-electrode or the second touch sub-electrode) exhibits a jagged pattern, thereby further improving the anti-ghosting effect. Those skilled in the art will appreciate that the electrode slit 221 may also have other shapes such as straight lines or curves.

In some exemplary embodiments, a first slit 207 and at least two second bridges 208 are disposed between two touch sensing units 20 adjacent in the first direction X. Thereby, the anti-ghosting effect of the touch panel is further improved, and the bending resistance of the touch panel 100 in the second direction Y is enhanced.

Figure 6:
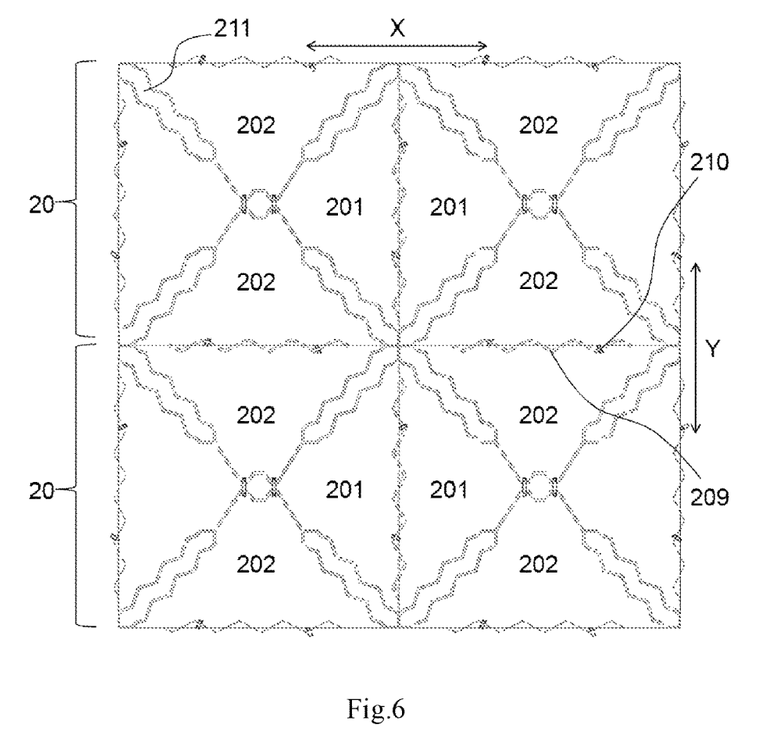
FIG. 6 is a schematic structural diagram of four adjacent touch sensing units according to an exemplary embodiment of the present disclosure.

FIG. 6 is a schematic structural diagram of four adjacent touch sensing units according to an exemplary embodiment of the present disclosure. In some exemplary embodiments, as shown in FIG. 6, a second slit 209 and at least two third bridges 210 are disposed between two touch sensing units 20 adjacent in the second direction Y. The at least two third bridges 210 span the second slit 209 and electrically connect the two second touch sub-electrodes 202 which are directly adjacent in the two touch sensing units 20.

In some exemplary embodiments, a second slit 209 and at least two third bridges 210 are disposed between two touch sensing units 20 adjacent in the second direction Y. Thereby, the anti-ghosting effect of the touch panel is further improved. Further, the bending resistance of the touch panel in the first direction is enhanced.

In some exemplary embodiments, as shown in FIGS. 4-6, a length direction of the second bridge 208 and/or a length direction of the third bridge 210 are inclined to the first direction X.

Using the second bridge and/or the third bridge inclined to the first direction (or the second direction) may further enhance the anti-ghosting effect without affecting the conductivity between adjacent touch sensing units.

In some exemplary embodiments, the first slit 207 and the second slit 209 both have a jagged shape. Due to the reflection of light, the edges of the first slit 207 and the second slit 209 exhibit a jagged pattern, thereby further improving the anti-ghosting effect. Those skilled in the art will appreciate that the first slit 207 and the second slit 209 may also have other shapes such as straight lines or curves.

In some exemplary embodiments, as shown in FIG. 2, FIG. 4 and FIG. 6, each of the touch sensing units 20 further includes a floating electrode 211. The floating electrode 211 is located between the adjacent first touch sub-electrode 201 and the second touch sub-electrode 202 and is insulated from the first touch sub-electrode 201 and the second touch sub-electrode 202. The first touch sub-electrode 201, the second touch sub-electrode 202, and the floating electrode 211 are disposed in the same layer.

In the context of the present disclosure, the statement that two or more objects "are disposed in the same layer" means that the two or more objects are disposed on the same surface or are sandwiched in the same layer.

In some exemplary embodiments, using the floating electrode 211 insulated from the first touch sub-electrode 201 and the second touch sub-electrode 202 may shield electrical signal interference, thereby improving the touch sensitivity of the touch panel. In addition, since the use of the floating electrode 211 increases the total area of the electrode, the floating electrode 211 may be used to control the initial capacitance and the capacitance increment of the touch sensing unit 20, thereby adjusting electrical parameters of the touch sensing unit 20. In some exemplary embodiments, the first touch sub-electrode, the second touch sub-electrode, and the floating electrode in the touch panel may be fabricated using a single mask process, thereby simplifying process steps and reducing the overall thickness of the touch panel.

In some exemplary embodiment such as shown in FIGS. 2, 4, and 6, the floating electrode 211 has a jagged edge. The use of a floating electrode with a jagged edge further improves the anti-ghosting effect.

In some exemplary embodiments, the materials of the first touch sub-electrode 201, the second touch sub-electrode 202, the floating electrode 211, and the first bridge 203 are all transparent conductive materials. Those skilled in the art will appreciate that the second bridge 208 and the third bridge 210 may also be fabricated using the same transparent conductive material.

In some exemplary embodiments, the first touch sub-electrode, the second touch sub-electrode, the floating electrode, the first bridge, the second bridge, and the third bridge are fabricated by using transparent conductive materials, which may further eliminate the reflection of the ambient light by the touch sensing unit, thereby enhancing the anti-ghosting effect. Moreover, since the touch panel provided by the exemplary embodiment of the present disclosure has the above structural features, the undesirable characteristic of the transparent conductive material being easy to crack when bent is advantageously eliminated.

In some exemplary embodiments, the transparent conductive material is indium tin oxide or indium zinc oxide.

In some exemplary embodiments, a process such as magnetron sputtering, chemical vapor deposition, or sol-gel may be used to form an indium tin oxide or indium zinc oxide film layer, and the first touch sub-electrode, the second touch sub-electrode, the floating electrode, the first bridge, the second bridge, and the third bridge are fabricated using a mask process.

According to another aspect of the disclosure, an exemplary embodiment of the present disclosure also provides a touch display device. The touch display device includes the touch panel described in the above exemplary embodiments.

The touch display device may be any product or component having a display function, such as a mobile phone, a tablet computer, a television, a display, a notebook computer, a digital photo frame, a navigator, and the like. The implementation of the touch display device may refer to the exemplary embodiment of the touch panel described above, and the repeated description is omitted.

Figure 7:
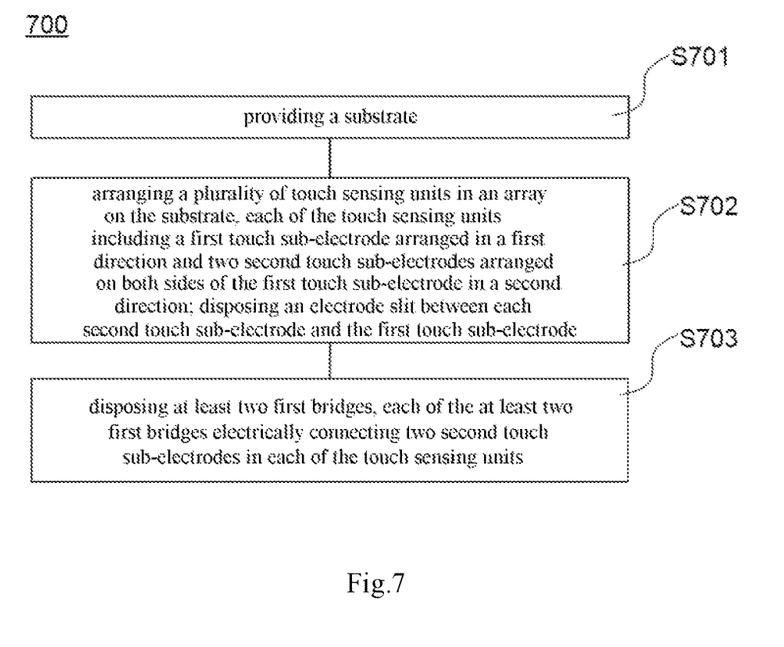
FIG. 7 is a flowchart of a method for fabricating a touch panel according to an exemplary embodiment of the disclosure.

According to another aspect of the disclosure, an exemplary embodiment of the present disclosure also provides a method for fabricating a touch panel. FIG. 7 is a flowchart of a method for fabricating a touch panel according to an exemplary embodiment of the disclosure. As shown in FIG. 7, the method 700 comprises: S701, providing a substrate; S702 arranging a plurality of touch sensing units in an array on the substrate, each of the touch sensing units including a first touch sub-electrode arranged in a first direction and two second touch sub-electrodes arranged on both sides of the first touch sub-electrode in a second direction; disposing an electrode slit between each second touch sub-electrode and the first touch sub-electrode; and S703 disposing at least two first bridges, each of the at least two first bridges electrically connecting two second touch sub-electrodes in each of the touch sensing units.

In the exemplary embodiment of the present disclosure, the two second touch sub-electrodes in each of the touch sensing units are electrically connected by at least two bridges. A via plug is provided in a via at a position where each of the bridge contacts the second touch sub-electrodes. Therefore, using at least four independent bridge points, the bridge structure in the touch sensing unit will be less obvious, and the anti-ghosting effect of the touch panel is improved. Also, using at least two bridges increases the ability of the touch sensing unit to release stress. When the touch panel provided in the exemplary embodiment of the present disclosure is bent in any direction, at least two bridges in each touch sensing unit may effectively release stress, and disconnection between the two second touch sub-electrodes is avoided, thus increasing the reliability of the bendable touch panel. In addition, with the above arrangement, various sizes of touch sensing units may be fabricated to support touch chips having various channel numbers and touch schemes.

Optionally, the exemplary method also comprises: between two touch sensing units adjacent in the first direction, disposing a first slit and at least two second bridges. The at least two second bridges span the first slit and electrically connect two first touch sub-electrodes of the two touch sensing units.

In some exemplary embodiments, between two touch sensing units adjacent in the first direction, a first slit and at least two second bridges are disposed. Thereby, the anti-ghosting effect of the touch panel is further improved. Further, the bending resistance of the touch panel in the second direction is enhanced. A person skilled in the art may understand that the first slot may be formed simultaneously with the first touch sub-electrode and the second touch sub-electrode, and the at least two second bridges may be formed simultaneously with the at least two first bridges.

In some exemplary embodiments, the method also comprises: between two touch sensing units adjacent in the second direction, disposing a second slit and at least two third bridges. The at least two third bridges span the second slit and electrically connect two second touch sub-electrodes which are directly adjacent in the two touch sensing units.

In some exemplary embodiments, a second slit and at least two third bridges are disposed between two touch sensing units adjacent in the second direction. Thereby, the anti-ghosting effect of the touch panel is further improved. Further, the bending resistance of the touch panel in the first direction is enhanced. A person skilled in the art may understand that the second slot may be formed simultaneously with the first touch sub-electrode and the second touch sub-electrode, and the at least two third bridges may be formed simultaneously with the at least two first bridges.

In some exemplary embodiments, the method further comprises: disposing a floating electrode in each of the touch sensing units, the floating electrode located between adjacent first touch sub-electrode and the second touch sub-electrode, and insulated from the first touch sub-electrode and the second touch sub-electrode. The first touch sub-electrode, the second touch sub-electrode and the floating electrode are disposed in the same layer.

In some exemplary embodiments, the floating electrode insulated from the first touch sub-electrode and the second touch sub-electrode may shield electrical signal interference, thereby improving the touch sensitivity of the touch panel. In addition, the floating electrode may be used to control the initial capacitance and the capacitance increment of the touch sensing unit, thereby adjusting electrical parameters of the touch sensing unit. In some exemplary embodiments, the first touch sub-electrode, the second touch sub-electrode, and the floating electrode in the touch panel may be fabricated using a single mask process, thereby simplifying the process steps and reducing the overall thickness of the touch panel. In some exemplary embodiments, the floating electrode has a jagged edge. The use of a floating electrode with a jagged edge further improves the anti-ghosting effect.

In some exemplary embodiments, the first touch sub-electrode, the second touch sub-electrode, and the floating electrode in the touch panel are fabricated using a single mask process.

In some exemplary embodiments, the first touch sub-electrode, the second touch sub-electrode, and the floating electrode in the touch panel may be fabricated using a single mask process, thereby simplifying the process steps and reducing the overall thickness of the touch panel.

In some exemplary embodiments, the step of arranging the plurality of touch sensing units on the substrate comprises: forming a pattern of the first touch sub-electrode and the second touch sub-electrodes on the substrate by a photolithography process; the step of disposing at least two first bridges comprises: forming a first photoresist layer covering a pattern of the first touch sub-electrode and the second touch sub-electrode, forming a via in the first photoresist layer at a position corresponding to a bridge point of the first bridge, and filling the via with a conductive material and forming the first bridge.

FIGS. 8a-8d are schematic diagrams showing each step of a method for fabricating a touch panel according to an exemplary embodiment of the present disclosure, respectively. An exemplary method for fabricating a touch panel will be described below with reference to FIGS. 8a-8d. Those skilled in the art will appreciate that only a cross-sectional view of a structure of a single touch sensing unit in a direction parallel with the second direction Y is exemplarily shown in FIGS. 8a-8d.

Figure 8A:
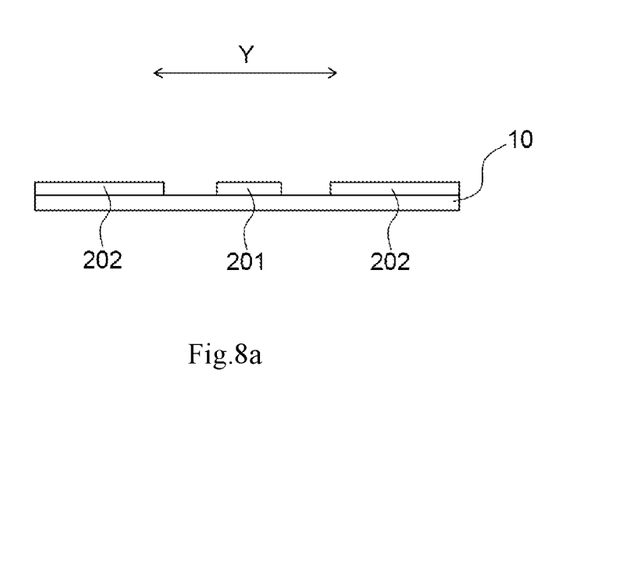
FIGS. 8a-8d are schematic diagrams showing each step of a method for fabricating a touch panel according to an exemplary embodiment of the present disclosure.

As shown in FIG. 8a, a pattern of the first touch sub-electrode 201 and the second touch sub-electrode 202 is formed on the substrate 10 by a photolithography process. The substrate 10 may be a glass substrate or a cycloolefin copolymer (COP) thin film. The material of the first touch sub-electrode 201 and the second touch sub-electrode 202 may be ITO.

Figure 8B:
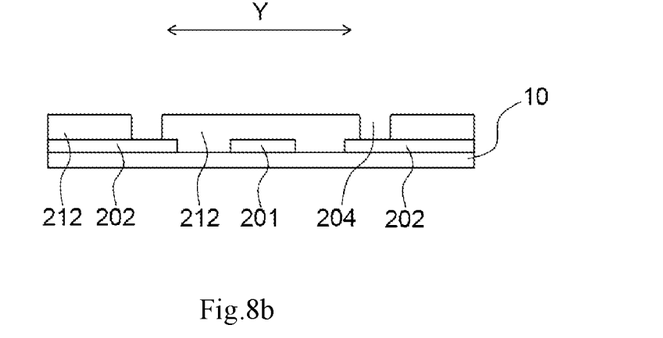

As shown in FIG. 8b, an optical adhesive (OCA) 212 is coated on the pattern of the first touch sub-electrode 201 and the second touch sub-electrode 202, and a via 204 is formed at a bridge point by a photolithography process.

Figure 8C:
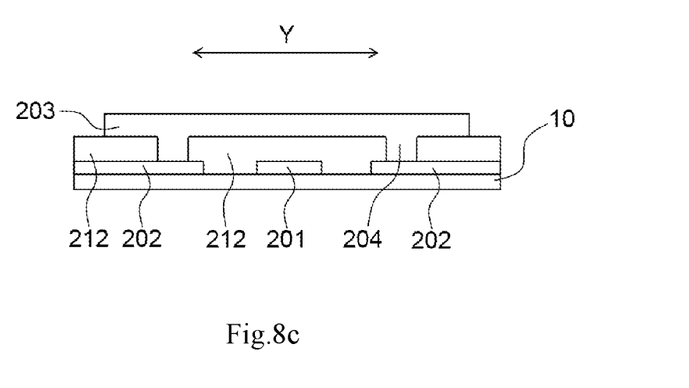
Figure 8D:
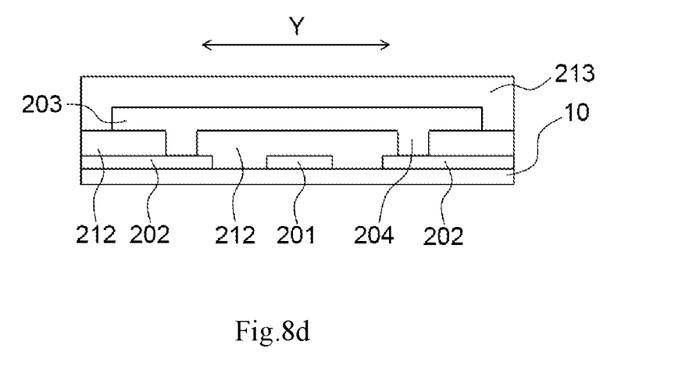

As shown in FIG. 8c, a conductive material such as ITO is formed inside the via 204 and on a surface of the optical adhesive 212 by, for example, a sputtering process. The first bridge 203 is then formed using a photolithography process. As shown in FIG. 8d, on the basis of the structure shown in FIG. 8c, an optical adhesive 213 is coated, thereby completing the structure of the touch sensing unit.

In some exemplary embodiments, before the step of disposing the at least two first bridges, the method may further comprise: forming a metal trace pattern around the pattern of the first touch sub-electrode and the second touch sub-electrode.

As shown in FIG. 1, in some exemplary embodiments, a trace area 30 may also be arranged around the plurality of touch sensing units 20 arranged in an array. A metal trace pattern may be arranged inside the trace area 30 for connecting the plurality of touch sensing units 20 to an external circuit.

In the touch panel, the touch display device, and the method for fabricating the touch panel according to an exemplary embodiment of the present disclosures, the two second touch sub-electrodes in each of the touch sensing units are electrically connected by at least two bridges. A via plug is provided in the via at a position where each of the bridge contacts the second touch sub-electrodes. Therefore, using at least four independent bridge points, the bridge structure in the touch sensing unit will be less obvious, and the anti-ghosting effect of the touch panel is improved. Also, the use of at least two bridges increases the ability of the touch sensing unit to release stress. When the touch panel provided in the exemplary embodiment of the present disclosure is bent in any direction, at least two bridges in each touch sensing unit may effectively release stress, and disconnection between the two second touch sub-electrodes is avoided, thus increasing the reliability of the bendable touch panel. In addition, with the above arrangement, various sizes of touch sensing units may be fabricated to support touch chips having various channel numbers and touch schemes.

It will be apparent to those skilled in the art that various modifications and changes may be made in the present disclosure without departing from the spirit and scope of the disclosure. Thus, if such modifications and variations of the present disclosure are within the scope of the claims and equivalents, the present disclosure is intended to cover such modifications and variations.

The invention claimed is:

1. A touch panel comprising:
a substrate;
a plurality of touch sensing units arranged in an array on the substrate, each of the plurality of touch sensing units including a first touch sub-electrode arranged in a first direction, two second touch sub-electrodes arranged on both sides of the first touch sub-electrode and arranged in a second direction, and an electrode slit disposed between each of the two second touch sub-electrodes and the first touch sub-electrode;
wherein the two second touch sub-electrodes in each of the plurality of touch sensing units are electrically connected via at least two first bridges;
and wherein between two touch sensing units directly adjacent in the first direction, a first slit and at least two second bridges are disposed; the first slit extends substantially in the second direction; each second bridge of the at least two second bridges spans the first slit and is directly electrically connected to two directly adjacent first touch sub-electrodes in the two touch sensing units directly adjacent in the first direction.

2. The touch panel of claim 1, wherein the electrode slit has a jagged shape.

3. The touch panel of claim 1, wherein between two touch sensing units adjacent in the second direction, a second slit and at least two third bridges are disposed, the at least two third bridges span the second slit and electrically connect the two second touch sub-electrodes which are directly adjacent in the two touch sensing units.

4. The touch panel of claim 3, wherein at least one of a length direction of the second bridge and a length direction of the third bridge is inclined to the first direction.

5. The touch panel of claim 3, wherein the first slit and the second slit both have a jagged shape.

6. The touch panel of claim 1, wherein each of the plurality of touch sensing units further includes a floating electrode, the floating electrode is located between a first touch sub-electrode and a second touch sub-electrode which are adjacent to each other, and is insulated from the first touch sub-electrode and the second touch sub-electrode; and wherein the first touch sub-electrode, the second touch sub-electrode and the floating electrode are disposed in a same layer.

7. The touch panel of claim 6, wherein the floating electrode has a jagged edge.

8. The touch panel of claim 6, wherein materials of the first touch sub-electrode, the second touch sub-electrode, the floating electrode, and the first bridge are all transparent conductive materials.

9. The touch panel of claim 8, wherein the transparent conductive materials are indium tin oxide or indium zinc oxide.

10. A touch display device comprising
the touch panel of claim 1.

11. A method for fabricating a touch panel, comprising:
providing a substrate;
arranging a plurality of touch sensing units in an array on the substrate, each of the plurality of touch sensing units including a first touch sub-electrode arranged in a first direction, and two second touch sub-electrodes arranged on both sides of the first touch sub-electrode and arranged in a second direction, disposing an electrode slit between each of the two second touch sub-electrodes and the first touch sub-electrode;

disposing at least two first bridges, each of the at least two first bridges electrically connecting the two second touch sub-electrodes in each of the plurality of touch sensing units; and between two touch sensing units directly adjacent in the first direction, disposing a first slit and at least two second bridges; wherein the first slit extends substantially in the second direction; each second bridge of the at least two second bridges spans the first slit and is directly electrically connected to two directly adjacent first touch sub-electrodes of in the two touch sensing units directly adjacent in the first direction.

12. The method of claim 11, further comprising: between two touch sensing units adjacent in the second direction, disposing a second slit and at least two third bridges, wherein the at least two third bridges span the second slit and electrically connect two second touch sub-electrodes which are directly adjacent in the two touch sensing units.

13. The method of claim 11, further comprising: disposing a floating electrode in each of the plurality of touch sensing units, wherein the floating electrode is located between a first touch sub-electrode and a second touch sub-electrode which are adjacent to each other, and is insulated from the first touch sub-electrode and the second touch sub-electrode; wherein the first touch sub-electrode, the second touch sub-electrode and the floating electrode are disposed in a same layer.

14. The method of claim 13, wherein the floating electrode has a jagged edge.

15. The method of claim 13, wherein the first touch sub-electrode, the second touch sub-electrode, and the floating electrode in the touch panel are fabricated using a single mask process.

16. The method of claim 11, wherein the step of arranging the plurality of touch sensing units on the substrate comprises:

forming a pattern of the first touch sub-electrode and the second touch sub-electrodes on the substrate by a photolithography process; and the step of disposing at least two first bridges comprises:
forming a first photoresist layer covering the pattern of the first touch sub-electrode and the second touch sub-electrode, forming a via in the first photoresist layer at a position corresponding to a bridge point of the first bridge, and filling the via with a conductive material and forming the first bridge.

17. The method of claim 16, wherein before the step of disposing the at least two first bridges, the method further comprises: forming a metal trace pattern around the pattern of the first touch sub-electrode and the second touch sub-electrode.

18. The touch display device of claim 10, wherein the electrode slit has a jagged shape.

* * * * *